US012291891B2

(12) United States Patent
Manly et al.

(10) Patent No.: US 12,291,891 B2
(45) Date of Patent: May 6, 2025

(54) LEVER COMPRESSION LATCH

(71) Applicant: Southco, Inc., Concordville, PA (US)

(72) Inventors: Jonathan Edward Manly, Great Barr (GB); James Joseph Ford, West Chester, PA (US); David Jonathan Kelly, Rushwick (GB); Loc Ba Tieu, Exton, PA (US)

(73) Assignee: Southco, Inc., Concordville, PA (US)

( * ) Notice: Subject to any disclaimer, the term of this patent is extended or adjusted under 35 U.S.C. 154(b) by 837 days.

(21) Appl. No.: 16/762,791

(22) PCT Filed: Nov. 6, 2018

(86) PCT No.: PCT/US2018/059357
§ 371 (c)(1),
(2) Date: May 8, 2020

(87) PCT Pub. No.: WO2019/094358
PCT Pub. Date: May 16, 2019

(65) Prior Publication Data

US 2021/0010291 A1 Jan. 14, 2021

Related U.S. Application Data

(60) Provisional application No. 62/584,426, filed on Nov. 10, 2017.

(51) Int. Cl.
*E05B 13/00* (2006.01)
*E05B 1/00* (2006.01)
(Continued)

(52) U.S. Cl.
CPC .......... *E05B 13/002* (2013.01); *E05B 1/0038* (2013.01); *E05B 5/006* (2013.01);
(Continued)

(58) Field of Classification Search
CPC . E05C 3/00; E05C 3/006; E05C 3/008; E05C 3/02; E05C 3/04; E05C 3/047;
(Continued)

(56) References Cited

U.S. PATENT DOCUMENTS 4,413,849 A 11/1983 Davis et al.
4,693,503 A 9/1987 Bisbing
(Continued)

FOREIGN PATENT DOCUMENTS

CN 1100172 A 3/1995
CN 1296108 A 5/2001
(Continued)

OTHER PUBLICATIONS

Computer Generated Translation for DE 29513978 U1, Generated on Feb. 15, 2023, https://worldwide.espacenet.com/patent/ (Year: 2023).*
(Continued)

*Primary Examiner* — Alyson M Merlino
(74) *Attorney, Agent, or Firm* — Buchanan Ingersoll & Rooney PC

(57) ABSTRACT

A latch assembly for mounting in an opening of a door and for releasably latching the door to a door frame. The latch assembly includes a housing that is mountable to the opening of the door. A lever is rotatably coupled to the housing between a deployed position and a retracted position. A lock plug is rotatably mounted within the housing, the lock plug having one end for receiving either a tool or key, and an opposite end having an engagement surface. A latching member is movably coupled to the housing, and is engaged with both the rotatable lock plug and the lever in the retracted position of the lever. A torsion spring biases the lock plug back to a starting position after the lock plug is rotated from the starting position using the tool or the key.

9 Claims, 10 Drawing Sheets

(51) Int. Cl.

| | |
|---|---|
| ***E05B 5/00*** | (2006.01) |
| ***E05B 9/02*** | (2006.01) |
| ***E05B 9/08*** | (2006.01) |
| ***E05B 17/00*** | (2006.01) |
| ***E05B 17/10*** | (2006.01) |
| ***E05B 35/00*** | (2006.01) |
| ***E05C 3/04*** | (2006.01) |
| *E05B 85/06* | (2014.01) |
| *E05B 85/10* | (2014.01) |

(52) U.S. Cl.
CPC .................. *E05B 9/02* (2013.01); *E05B 9/08* (2013.01); *E05B 17/0025* (2013.01); *E05B 17/10* (2013.01); *E05B 35/008* (2013.01); *E05C 3/048* (2013.01); *E05B 85/06* (2013.01); *E05B 85/103* (2013.01); *E05Y 2201/22* (2013.01); *E05Y 2201/244* (2013.01); *E05Y 2900/131* (2013.01); *E05Y 2900/132* (2013.01); *E05Y 2900/20* (2013.01); *E05Y 2900/531* (2013.01); *E05Y 2900/538* (2013.01)

(58) Field of Classification Search
CPC .......... E05C 3/048; E05C 19/10; E05C 19/12; E05C 19/14; E05C 19/145; E05B 13/002; E05B 5/00; E05B 5/006; E05B 9/02; E05B 9/08; E05B 35/008
See application file for complete search history.

(56) References Cited

U.S. PATENT DOCUMENTS

| | | | | | |
|---|---|---|---|---|---|
| 4,873,852 | A | | 10/1989 | Neyret | |
| 5,267,762 | A | | 12/1993 | Gromotka | |
| D343,782 | S | | 2/1994 | Gromotka et al. | |
| 5,340,174 | A | * | 8/1994 | Bender | E05B 79/06 292/DIG. 31 |
| 5,440,905 | A | * | 8/1995 | Yamada | E05B 13/002 292/DIG. 31 |
| 5,450,735 | A | * | 9/1995 | Esaki | E05B 5/003 292/DIG. 31 |
| 5,454,239 | A | | 10/1995 | Esaki et al. | |
| 5,467,623 | A | * | 11/1995 | Yamada | E05B 5/003 292/DIG. 31 |
| 5,469,725 | A | * | 11/1995 | Yamada | E05B 5/003 292/DIG. 31 |
| 5,638,709 | A | | 6/1997 | Clavin | |
| 6,203,076 | B1 | | 3/2001 | Wytcherley et al. | |
| 6,244,636 | B1 | | 6/2001 | Rissone | |
| 6,606,889 | B1 | * | 8/2003 | Tweedy | E05B 13/002 292/DIG. 31 |
| 6,640,592 | B2 | | 11/2003 | Vickers | |
| 6,668,602 | B2 | * | 12/2003 | Graham | E05C 5/00 292/DIG. 31 |
| 6,840,552 | B2 | | 1/2005 | Ramsauer | |
| 8,517,653 | B2 | | 8/2013 | Ramsauer | |
| 8,991,228 | B2 | * | 3/2015 | Yang | E05B 5/00 292/336.3 |
| 10,138,659 | B2 | * | 11/2018 | Redondo Guerra | E05B 5/00 |
| 10,450,778 | B2 | * | 10/2019 | Bennett | E05C 3/048 |
| 2010/0139339 | A1 | * | 6/2010 | Hu | E05B 13/002 70/91 |
| 2013/0106122 | A1 | * | 5/2013 | Do | E05B 5/003 292/228 |

FOREIGN PATENT DOCUMENTS

| | | | | | |
|---|---|---|---|---|---|
| CN | 1526048 | A | | 9/2004 | |
| CN | 1914392 | A | | 2/2007 | |
| CN | 201924708 | U | | 8/2011 | |
| CN | 104234553 | A | | 12/2014 | |
| CN | 106481157 | A | | 3/2017 | |
| DE | 29513978 | U1 | * | 12/1995 | |
| DE | S2077871 | | | 3/1998 | |
| DE | S498087260001 | | | 8/1998 | |
| DE | S498087270001 | | | 8/1998 | |
| DE | S498087270002 | | | 8/1998 | |
| DE | 20107170 | U1 | * | 8/2002 | E05C 9/041 |
| EP | 0315544 | A1 | | 5/1989 | |
| EP | 0406845 | A2 | | 1/1991 | |
| EP | 1329575 | A2 | * | 7/2003 | E05B 13/10 |
| FR | 2793276 | A1 | | 11/2000 | |
| GB | 2275079 | A | * | 8/1994 | E05B 13/002 |
| GB | 2275302 | A | * | 8/1994 | E05C 3/041 |
| GB | 2275964 | A | * | 9/1994 | E05B 13/10 |
| GB | 2288630 | A | * | 10/1995 | E05B 13/10 |
| JP | 2000054713 | A | | 2/2000 | |
| JP | 2004132133 | A | | 4/2004 | |
| KR | 20030074033 | A | | 9/2003 | |
| KR | 20090107681 | A | | 10/2009 | |
| WO | 0179629 | A1 | | 10/2001 | |
| WO | WO2010112052 | A1 | | 10/2010 | |

OTHER PUBLICATIONS

Chinese Office Action for Chinese Application No. 201880072895.6, dated Jun. 29, 2021 with translation, 17 pages.
Chinese Office Action for Chinese Application No. 201880072895.6, dated Feb. 8, 2022 with translation, 10 pages.
Indian Examination Report for Indian Application No. 202017021496, dated Mar. 11, 2022 with translation, 6 pages.
Chinese Office Action for Chinese Application No. 202111346931.3, dated Nov. 2, 2022, 7 pages.
BYMS612-1-1, Embedded Door Handle with Latches, www.newbuyoung.com, downloaded from the internet Jul. 31, 2020, 1 page.
Dirak 6-127SL Slam Latch SNAP-LINE, http://www.bdproduct.ca/wp-content/uploads/2013/06/6-127SL-Slam-Latch-SNAP-LINE, downloaded form the internat Jul. 31, 2020, 3 pages.
Southco Push to Close Latch, https://web.archive.org/web/20150226031235/http://www.southco.com/static/Literature/64.en, downloaded from the internet Jul. 31, 2020, 8 pages.
Burg C2 Slam, http://www.burg.de/en/produktkatalog/proconut/kategorie/anzeigen/kategorie/33/ch/db1d9, downloaded from the internet Jul. 31, 2020, 1 page.
International Preliminary Report on Patentability for Application No. PCT/US2018/059357, dated May 12, 2020, 13 pages.
International Search Report and Written Opinion for International Application PCT/US201/059357, dated Jul. 30, 2019, 18 pages.
HB39 C2 Adjustable Lever Latch, 1 page, date unknown.

* cited by examiner

LEVER COMPRESSION LATCH

CROSS-REFERENCE TO RELATED APPLICATIONS

This application is the U.S. national phase application of PCT Application No. US2018/059357 filed on Nov. 6, 2018 which is related to, and claims the benefit of priority of, U.S. Provisional Application No. 62/584,426 filed on Nov. 10, 2017, the contents of which are incorporated herein by reference in their entirety for all purposes.

FIELD OF THE INVENTION

The present invention relates generally to latching devices and more particularly to lever latches for fastening hinged doors, panels and the like.

BACKGROUND OF THE INVENTION

Compression latch devices for opening, closing and latching hinged doors and the like are disclosed in U.S. Pat. Nos. 4,693,503, 5,267,762 and 5,638,709, each of which is incorporated by reference herein in its entirety for all purposes. In such latch devices, a pivotally mounted and spring biased lever is rotatably mounted on a housing which is inserted into an opening formed in the panel of a hinged door. The lever is held in the closed position by a latch attached to the housing and engaging a hook integral with one end of the lever. On disengagement of the latch and hook, the lever is freed to pivot to an open position in response to a spring bias. The pivoted lever becomes a handle for use in opening and closing the door. In these devices the latch remains rotatably affixed to the housing and does not form a part of the handle nor does it move with the handle to the open position or to the closed position. The lever is re-latched when it is returned to the fully closed position with the hook at the end of the lever once again engaging the latch.

Improvements in compression latch devices are continually sought in the areas of security, functionality, convenience and production.

DETAILED DESCRIPTION OF THE INVENTION

Figure 1A:
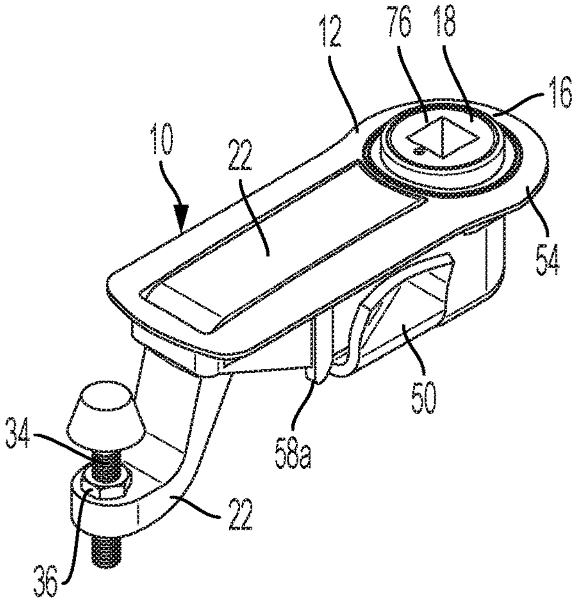
FIGS. 1A-1D are isometric, top plan, side elevation and bottom plan views, respectively, of an auto-relocking lever compression latch according to a first exemplary embodiment of the invention
Figure 1B:
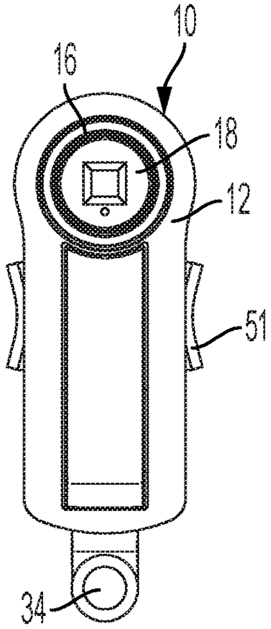
Figure 1C:
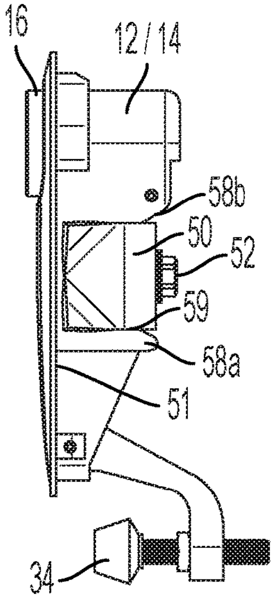

Although the invention is illustrated and described herein with reference to specific embodiments, the invention is not intended to be limited to the details shown. Rather, various modifications may be made in the details within the scope and range of equivalents of the claims and without departing from the invention.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both removable or rigid attachments or relationships, unless expressly described otherwise.

Figure 11:
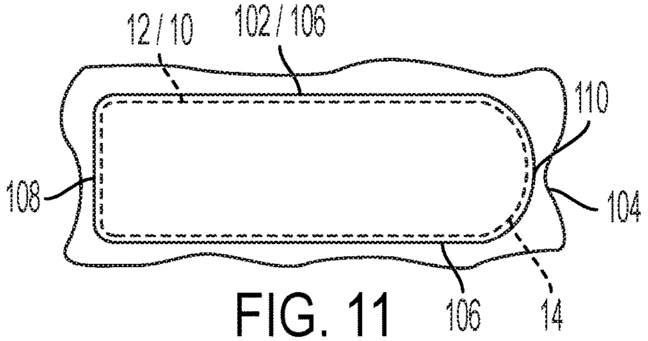
FIG. 11 depicts a door having a cutout for receiving the latch of FIGS. 1A-1F.

FIGS. 1A-1F show an auto-relocking lever compression latch 10 (latch 10 hereinafter) according to a first exemplary embodiment of the invention. The latch 10 is mounted in an opening formed in a door which can be closed over an opening in a door frame. An opening 102 formed in a door 104 for receiving the latch 10 is shown in FIG. 11. The door frame may form part of a cabinet or a motorized vehicle, for example, or any other known structure incorporating a door frame. FIG. 1 of U.S. Pat. No. 4,693,503, which is incorporated by reference, shows an arrangement of a latch mounted in an opening formed in a door which can be closed over an opening in a cabinet. The latch 10 described herein is mountable to a similar door, which is configured to be opened and closed over an opening in a door frame.

Figure 10A:
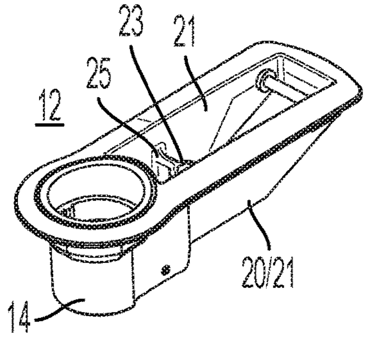
FIG. 10A depicts an isometric view of the housing of the latch of FIGS. 1A-1F.
Figure 10B:
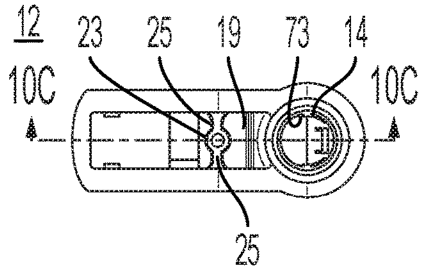
FIG. 10B depicts a top plan view of the housing of FIG. 10A.
Figure 10C:
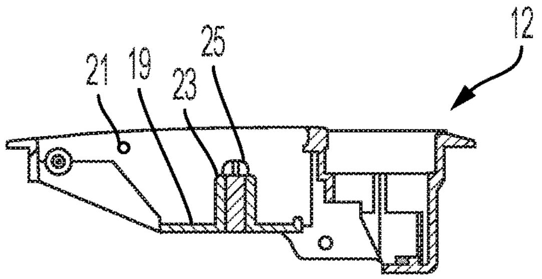
FIG. 10C depicts a cross-sectional view of the housing of FIG. 10B taken along the lines 10C-10C.

The latch 10 comprises a housing 12. Detailed views of the housing 12 are shown in FIGS. 10A-10C. The housing 12 includes a hollow cylindrical portion 14 at one end for receiving a cylindrical button 16 as well as cylindrical lock plug 18. A semi-rectangular shaped frame 20 having opposing side walls 21 extends from the hollow cylindrical portion 14. A lower wall 19 interconnects the side walls 21 of the housing.

The housing 12 includes holes and surfaces to which many of the remaining components of the latch 10 are attached, as will be described hereinafter.

Referring back to FIGS. 1A-1F, a lever 22 is rotatably mounted between the walls 21 of the frame 20 of the housing 12. The lever 22 is an elongated member having an L-shape. A hook 30 extends from the lower surface the lever 22 and is positioned adjacent the end 31 of the lever 22. The hook 30 is configured to interact with a latching member 32, the purpose of which will be described later.

A threaded thru-hole 33 is provided in an opposing end of the lever 22. A threaded post of an adjustable bumper screw 34 is threaded through both a nut 36 and the threaded thru-hole 33 of the lever 22, such that the nut 36 and the adjustable bumper screw 34 extend from the top side of the lever 22. The bumper screw 34 may be a threaded screw having a rubber piece that is over-molded on one end of the screw.

The lever 22 is rotatably mounted to the frame 20 of the housing 12 by a pin 24. The pin 24 extends through opposing holes 26 disposed on the side walls 21 of the housing 12, a thru-hole 28 of the lever 22, and a hole 27 in the coiled portion of a torsion spring 29. The torsion spring 29 biases the lever 22 in a clockwise rotational manner (as viewed in FIG. 1F) so that the hook 30 is biased upwards and outwards and away from the door to which the latch 10 is attached. It follows that the adjustable bumper screw 34 is biased downwards and away from the door frame.

The latching member 32 includes two V-shaped arms 38 that are positioned opposite one another. A hole 39 is defined at the intersection of the legs of each arm 38. The hole 39 defines the axis of rotation of the latching member 32. Posts 42 and 44 are provided at opposite ends of the arms 38 and connect the arms 38 together to form a unitary latching member 32. The latching member 32 is connected to the housing 12 by a pin 40. The pin 40 is positioned through opposing holes 45 in the walls 21 of the housing 12, through the holes 39 of the latching member 32, and through holes 46 provided in a soft-close spring 48.

The latching member 32 converts a translational push motion on the push button 16 (described later) into rotational motion for opening the latch 10. By virtue of the rotational motion provided by the latching member 32, the internal components of the latch 10 consume a limited amount of space.

The soft-close spring 48 is a torsion spring having multiple arms. As best shown in FIG. 2B, the lower arm 48*a* of the spring 48 is positioned against the base surface of the cylindrical portion 14 of the housing 12, and the upper arms 48*b* of the spring 48 are positioned against the post 44 of the latching member 32. The spring 48 is configured to bias the latching member 32 in a counterclockwise rotational direction (as viewed in FIG. 2B). In other words, the spring 48 is configured to bias the post 44 in an upward direction, and bias the post 42 in a downward direction against the hook 30 (in the closed state of the lever 22). The posts 42 and 44 may also be referred to herein as engagement surfaces for engaging the lever 22 and the latching member 32, respectively.

Figure 1D:
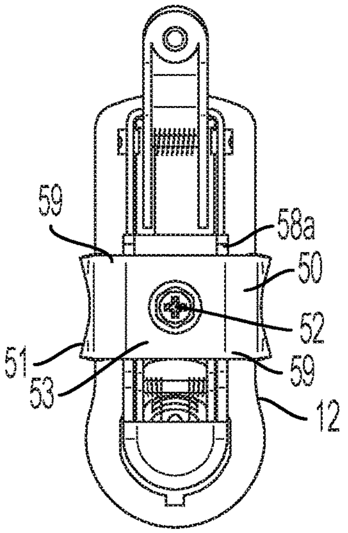
Figure 1E:
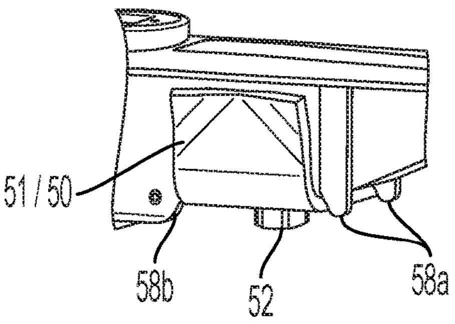
FIG. 1E is a detailed isometric view of the latch of FIGS. 1A-1D.

As best shown in FIGS. 1D and 1E, a mounting bracket 50 is mounted to the lower side of the frame 20 of the housing 12 by a threaded fastener 52. The bracket 50 is a C-shaped member having opposing arms 51 depending from a mounting surface 53 at right angles. The threaded fastener 52 is positioned through a thru-hole in the center of the mounting surface 53 of the bracket 50. The fastener 52 is threadedly connected to a threaded hole that is defined in the boss 23 on the lower wall of the frame 20. Like the mounting bracket of U.S. Pat. No. 4,693,503, the bracket 50 mounts the latch 10 to the door. More particularly, one side of the door is contacted by the radially extending lip 54 of the housing 12 and the opposite side of the door is contacted by the free ends of the arms 51 of the bracket 50, thereby fixing the latch 10 to the door.

Two bearing structures 58*a* and 58*b* (referred to collectively as bearing structures 58) extend from the lower surface of each wall 21 of the housing 12 for preventing rotation of the bracket 50 upon mounting the latch 10 to the door. The bearing structures 58*a* are thin vertically extending elongate members or posts, whereas the bearing structures 58*b* may be an angled surface extending from the cylindrical portion 14 of the housing 12. The bearing structures 58 together serve to prevent rotation of the bracket 50 as the fastener 52 is threaded into the boss 23 of the housing 12. The opposing sides 59 of the mounting surface 53 of the bracket 50 are positioned tightly against each bearing structure 58. In other words, the bracket 50 is sandwiched between the bearing structures 58*a* and 58*b* of each wall 21 of the housing 12.

Although housing 12 includes four bearing structures, it should be understood that the housing 12 can include one or more bearing structures to achieve the same result. For example, bearing structures 58*a* may be omitted.

As best shown in FIGS. 10A-10C, a boss 23 projects upwardly from the lower wall 19 of the housing 12 into the interior region of the housing 12. The boss 23 includes a threaded thru-hole for receiving the threaded fastener 52 attached to the bracket 50 (FIG. 1E). A rib 25 extends from each side wall 21 to the boss 23. The ribs 25 and the boss 23 form a continuous structure that extends between and interconnects the side walls 21. The boss 23 and the ribs 25 extend upwardly from the lower wall 19 of the housing 12 to approximately the same elevation.

In the process of mounting the latch 10 onto the door using the bracket 50 and fastener 52, the ribs 25 either substantially limit or prevent the sidewalls 21 from flexing inwardly toward one another. If the sidewalls 21 were permitted to flex inwardly toward each other to a significant degree, then the deformed sidewalls could cause the lever 22 (described hereinafter) to become immovably wedged within the interior of the housing 12.

Referring back to FIG. 1F, a push button 16 having a hollow cylindrical shape is positioned within the interior space of the cylindrical portion 14 of the housing 12. The button 16 includes an interior shoulder 62 upon which the lock plug 18 is seated. A compression spring 64 is positioned between an annular shoulder 66, which is defined in the interior of the cylindrical portion 14 of the housing 12, and an annular shoulder 68 that is formed on the exterior surface of the button 16. The spring 64 is positioned to bias the button 16 (along with the lock plug 18 seated therein) in an upward vertical direction and away from the latching member 32.

The button 16 is capable of axial translation with respect to the housing 12, however, the button 16 is non-rotatable and prevented from rotation with respect to the housing 12. More particularly, one or more flexible clips 70 are provided on the lower end of the button 16 for mating with respective openings or surfaces formed in the cylindrical portion 14 of the housing 12. Engagement between the clip 70 and the housing 12 prevents the button 16 from becoming detached from the housing 12. The button 16 is prevented from rotation with the cylindrical portion 14 of the housing 12 by the engagement between a recess 72 formed on the outer surface of the button 16 and a mating rib 73 (see FIG. 10B) formed on the interior surface of the cylindrical portion 14 of the housing 12. Those skilled in the art will recognize that the recess may be provided on the housing 12 and the rib may be provided on the button 16 to achieve the same result.

The lock plug 18 is rotatably positioned within the interior region of the button 16 and can rotate with respect to the button 16 and the housing 12. The top surface of the lock plug 18 includes an opening 76 for receiving either a tool or key. The opening 76 may be a Rail Standard recess as shown, or it may have any other shape known in the art for receiving either a tool or key. By way of non-limiting example, the opening 76 may be a key-locking recess, a hex recess, a TORX® recess, a Phillips recess, a slotted recess, a Rail Standard square shaped recess, a 7 mm recess, for example.

Figure 1F:
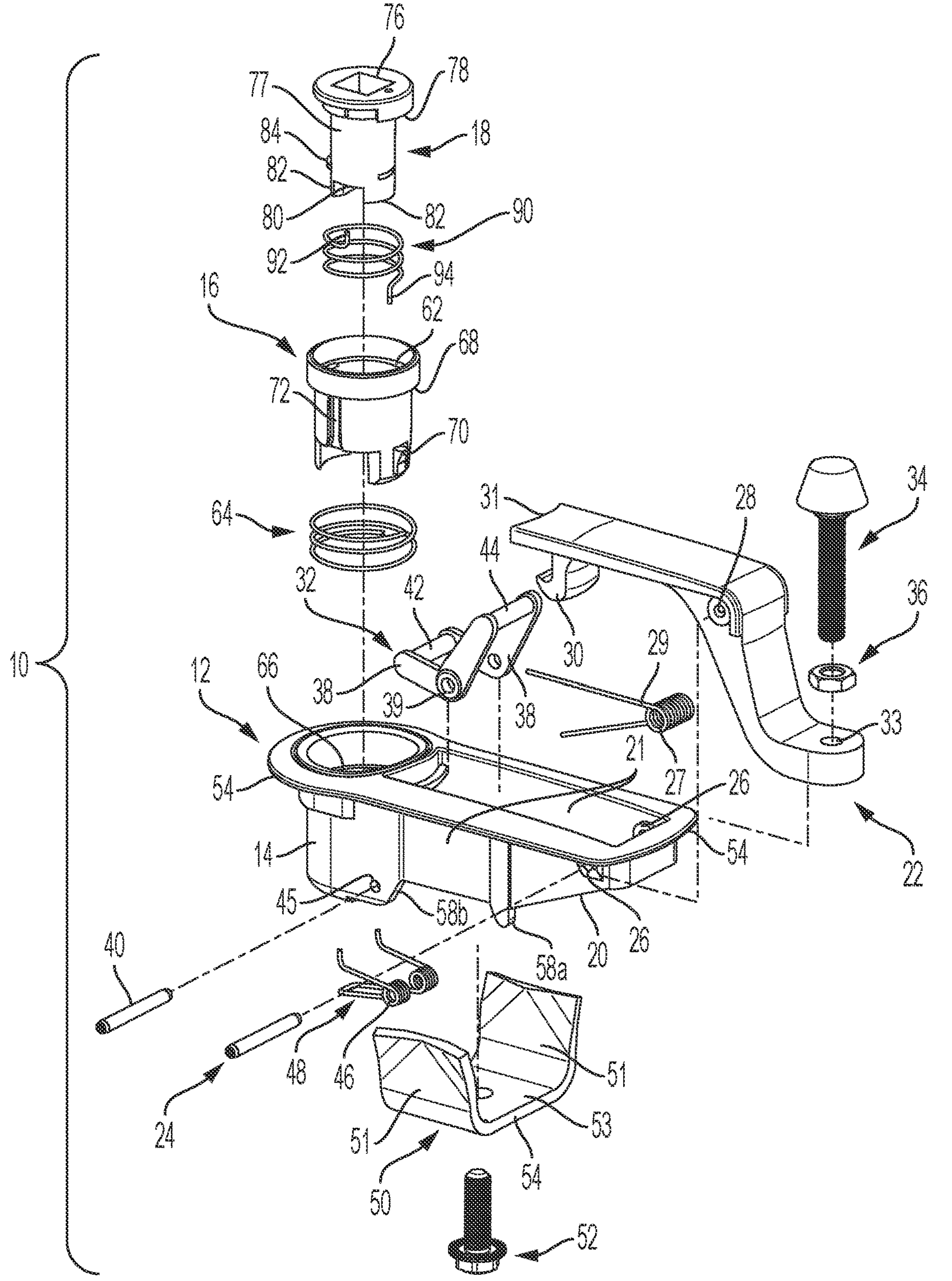
FIG. 1F is an exploded view of the latch of FIGS. 1A-1E.
Figure 9:
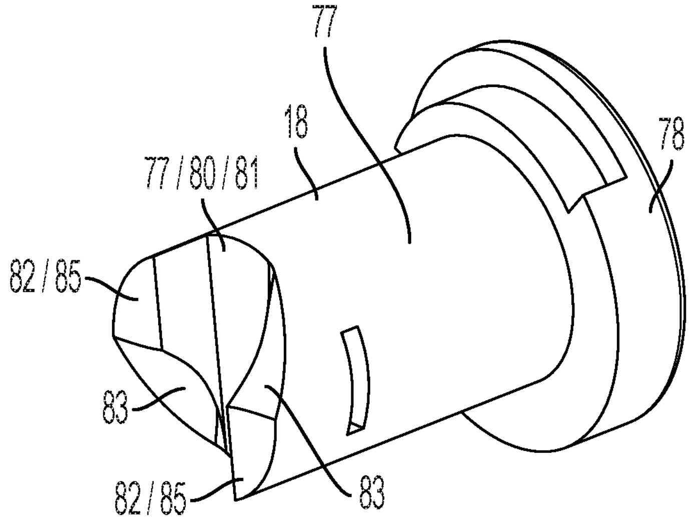
FIG. 9 is a bottom-side isometric view of the lock plug of the latch.

As best shown in FIGS. 1F and 9, the lock plug 18 is a substantially cylindrical body 77 having a diametrically enlarged head upon which the opening 76 is provided and a shoulder 78 provided at the intersection of the enlarged head and the remainder of the cylindrical body 77. The lower end of the body 77 includes a rectangular slot 80. The slot 80 is sized to receive the post 44 of the latch 10 and confers a "soft-locking" functionality to the latch 10, as will be described with reference to FIG. 3B.

The base of the slot 80 is defined on a base surface 81 of the body 77. Two legs 82 are formed by the sides of the slot 80. The legs 82 are mirror-images of each other. Each leg 82 includes a rounded cam surface 83 that gradually rises from the base surface 81 to a flat top surface 85. The flat top surface 85 is an engagement surface that is configured to engage the post 44 (i.e., the engagement surface) of the latching member 32. The flat top surface 85 may also be referred to herein as an elevated surface that is elevated with respect to the base surface 81.

The purpose of the slot 80 and the cam surfaces 83 will be described in greater detail with respect to operation of the latch 10. The cam surface 83 may be omitted for the embodiment shown in FIGS. 1A-9, however, the cam surface 83 is instrumental for the embodiment shown in FIG. 14.

As best shown in FIG. 2B, a protrusion 84 extends in an outward radial direction from the outer surface of the body 77, and is positioned beneath a shoulder 86 that extends in an inward radial direction from the interior surface of the button 16. The shoulder 86 prevents the body 77 of the lock plug 18 from inadvertently detaching from the button 16 and the housing 12. The protrusion 84 may be a surface, or a separate clip that is mounted to the body 77. By virtue of the engagement between the shoulder 86 and the protrusion 84, the lock plug 18 translates in an axial direction along with the button 16 against the bias of the spring 64.

Referring now to FIGS. 1F and 2B, a torsion spring 90 is mounted to the lock plug 18 and the button 16 for controlling rotation of the lock plug 18 within the button 16. One end 92 of the torsion spring 90 is mounted in a recess or positioned against a surface provided on the shoulder 78 of the lock plug 18, whereas the other end 94 of the torsion spring 90 is mounted in a recess or positioned against a surface provided on an interior shoulder 96 of the button 16.

It is envisioned that the button 16 could be unitized with the lock plug 18 such that those components both rotate and translate together. In such an instance, one leg of the spring 90 (described later) would be mounted to the unitized lock plug button and the other leg of the spring 90 would be mounted directly to the housing 12.

Figure 2A:
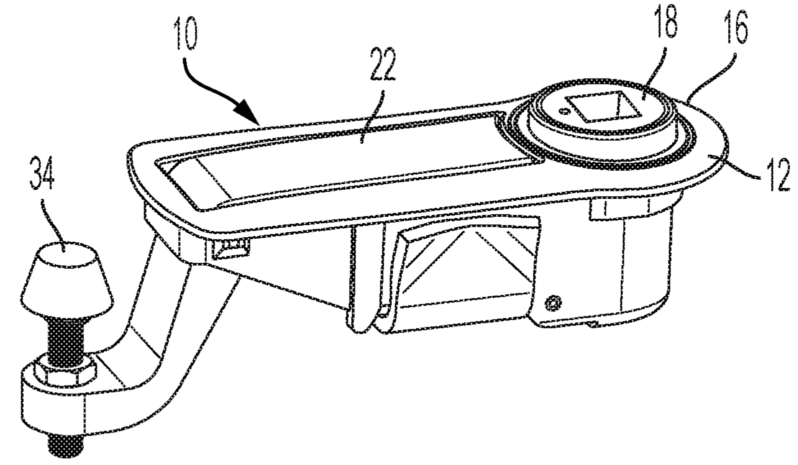
FIG. 2A is an isometric view of the latch of FIGS. 1A-1F in which the latch is locked.
Figure 2B:
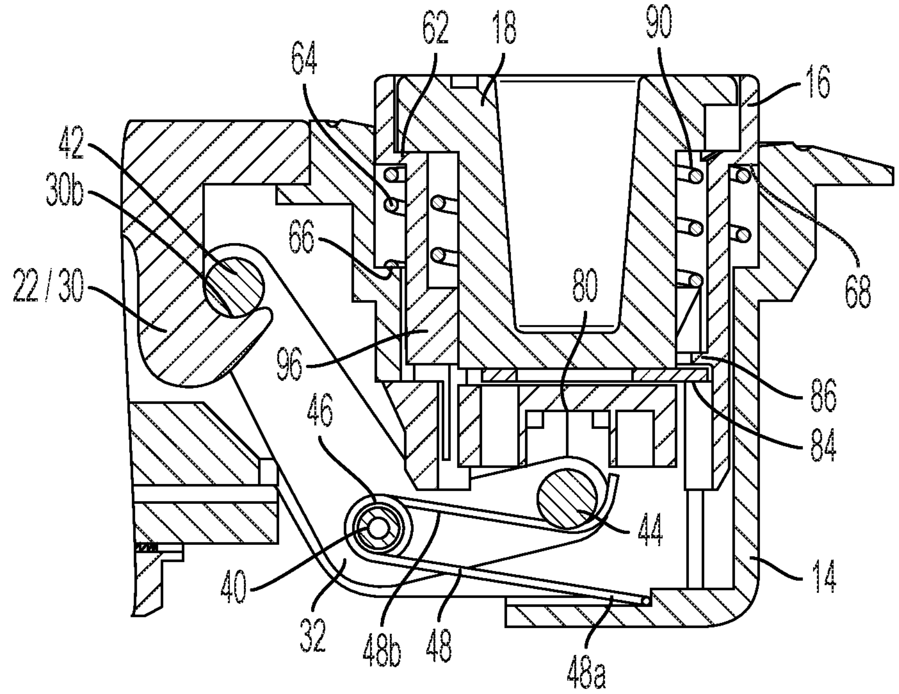
FIG. 2B is a cross-sectional view of the latch of FIG. 2A.

Referring now to operation of the latch 10, FIGS. 2A and 2B depict the latch 10 in a locked state. In the locked state, the door (not shown) to which the latch 10 is mounted, is closed over an opening in a door frame (not shown). The door and its latch 10 are locked to the door frame because the bumper portion of the bumper screw 34 bears against an inside surface of the door frame and is locked in a fixed position.

FIG. 2B depicts the hook 30 of the lever 22 captivated by the post 42 of the latching member 32. Due to the engagement between the hook 30 and the post 42, the lever 22 is prevented from rotating outwards by the post 42, and the latch 10 is maintained in a locked state.

Figure 3A:
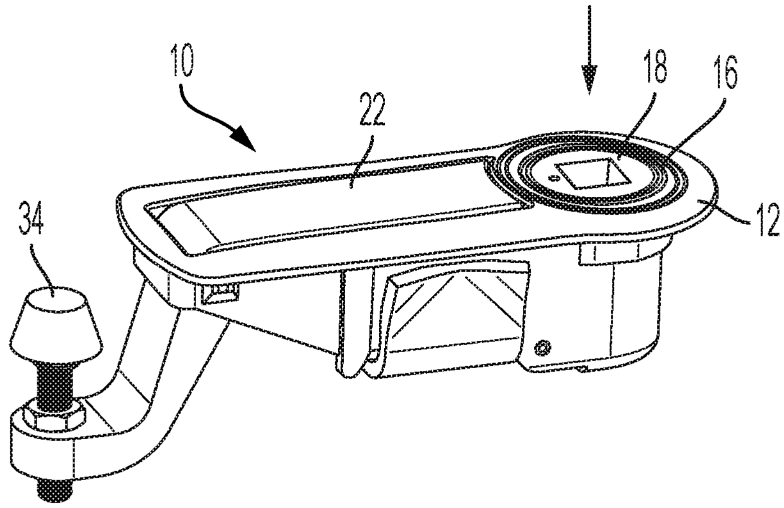
FIG. 3A is an isometric view of the latch of FIG. 2A in which the push button of the locked latch is shown depressed.
Figure 3B:
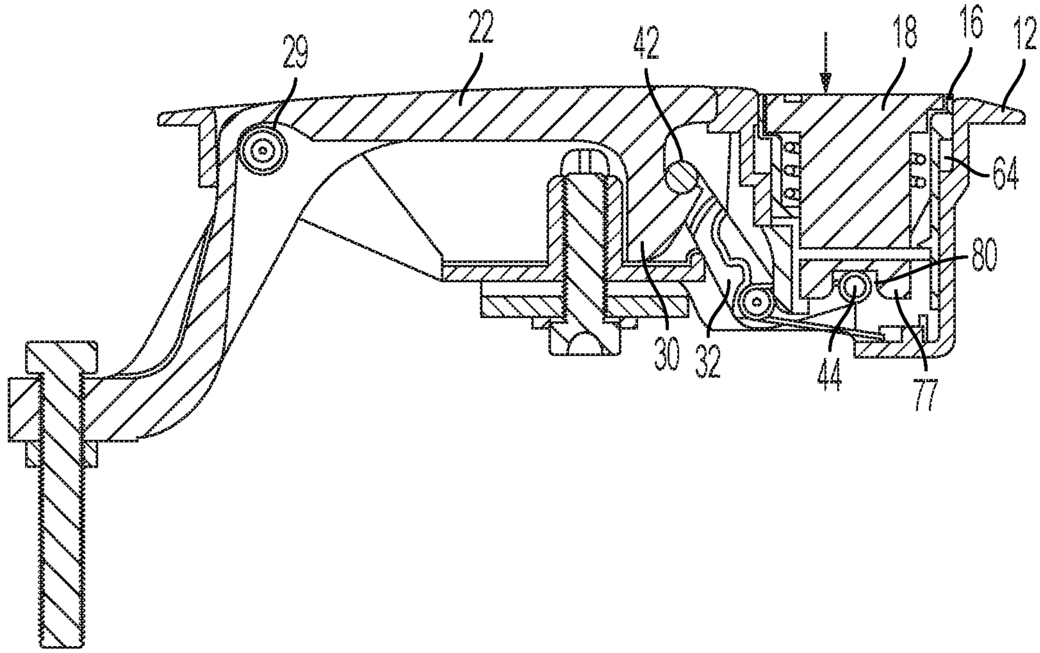
FIG. 3B is a cross-sectional view of the latch of FIG. 3A.

FIGS. 3A and 3B show the soft-locking functionality of the latch 10. It should be understood that operation of the latch 10 does not require the step shown in FIGS. 3A and 3B.

FIGS. 3A and 3B depict the latch 10 of FIG. 2A in which the push button 16 and the lock body 18 of the latch 10, which is locked, are shown depressed. The latch 10 has a "soft-locking" feature whereby it is possible for a user to depress (see arrow in FIG. 3B) the push button 16 and the lock plug 18 while the latch 10 is locked and without unlocking the latch 10. More particularly, as shown in FIG. 3B, when a user depresses the push button 16 and the lock plug 18 against the bias of the spring 64 while the latch 10 is locked, the slot 80 of the lock plug body 77 travels over the post 44 of the latching member 32 without contacting the post 44. Thus, the latching member 32 remains in the locked position in which the post 42 captivates the hook 30 of the lever 22.

Once the push button 16 and the lock plug 18 are released by the user, those components move upwardly under the bias of the spring 64.

Figure 4A:
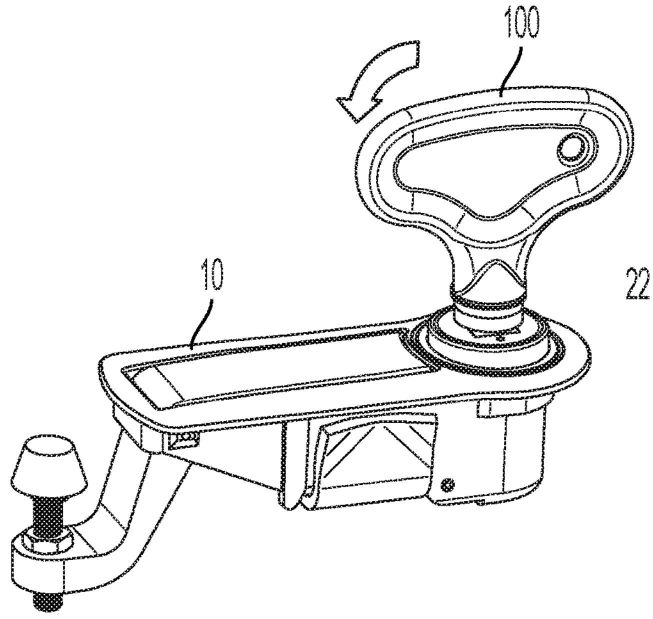
FIG. 4A is an isometric view of the latch of FIG. 3A in which a tool is inserted and rotated in the lock plug and the latch is unlocked.
Figure 4B:
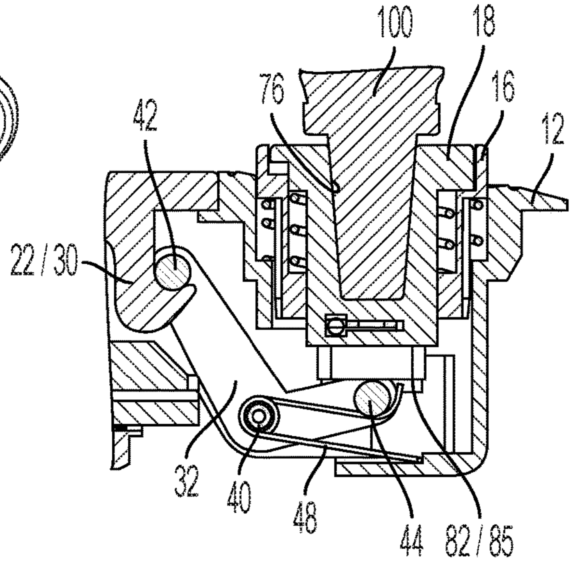
FIG. 4B is a cross-sectional view of the latch of FIG. 4A.

FIGS. 4A and 4B depict the latch 10 of FIG. 3A in which a tool 100 (or key) is inserted in the opening 76 of the lock plug 18 and then rotated in the lock plug 18 against the bias of the torsion spring 90 thereby unlocking the lock plug 18. At this stage, however, the latch 10 is still latched because the hook 30 of the lever 22 remains retained by the post 42. In operation, as the tool 100 rotates the lock plug 18, the post 44 of the latching member 32 gradually rides up the cam surfaces 83 until the post 44 sits on the top surface 85 of the legs 82 (as shown in FIG. 4B).

Figure 5A:
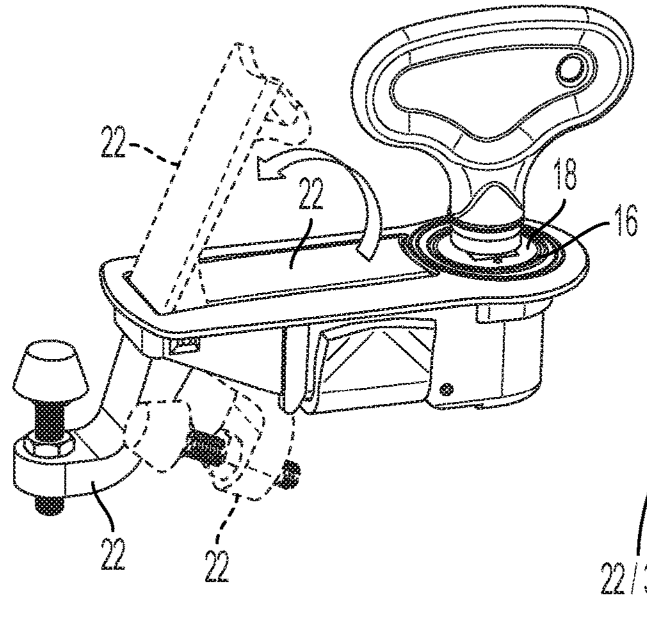
FIG. 5A is an isometric view of the latch of FIG. 4A in which the tool is depressed, thereby releasing the lever of the unlocked latch.
Figure 5B:
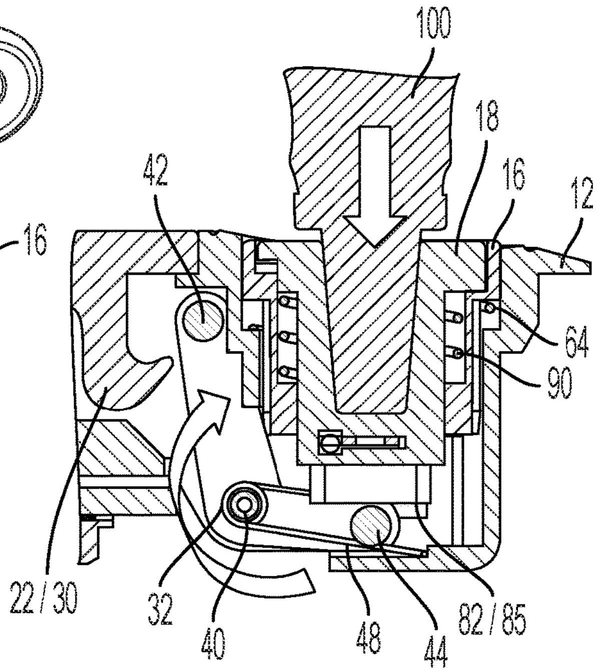
FIG. 5B is a cross-sectional view of the latch of FIG. 5A.

FIGS. 5A and 5B depict the latch 10 of FIG. 4A in which the tool 100, the lock plug 18 and the button 16 are simultaneously depressed by the user (as depicted by the arrow in FIGS. 5A and 5B) against the bias of the spring 64. Depressing the lock plug 18 causes the legs 82 of the lock plug 18 to translate the post 44 of the latching member 32 in a downward direction. The latching member 32 consequently pivots in a clockwise direction (as depicted by the arrow in FIG. 5B) about the pin 40 and against the bias of the soft close spring 48. The post 42 of the latching member

32 rotates along with the remainder of the latching member 32, which causes the post 42 to separate from the hook 30 of the lever 22. The lever 22, which is spring-loaded by the torsion spring 29 (see FIG. 3B) and no longer constrained by the latching member 32, rotates outward and in a counter-clockwise direction (as depicted by the arrow in FIG. 5A). The latch 10 is now in an unlocked and opened state.

Figure 6:
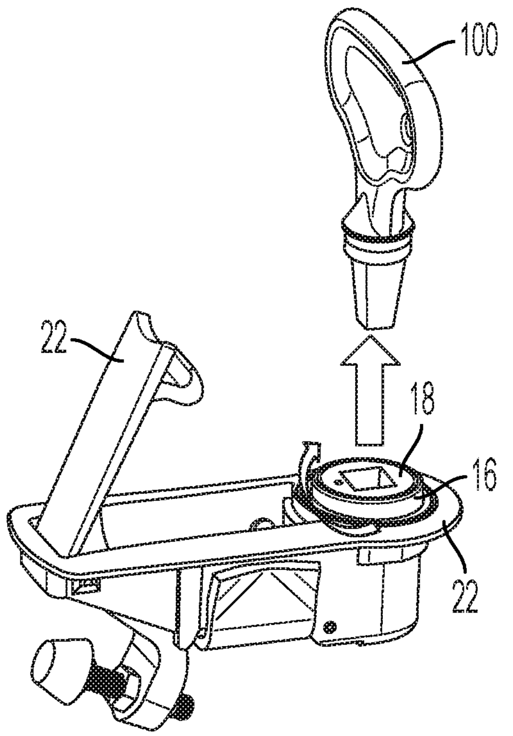
FIG. 6 is an isometric view of the latch of FIG. 5A in which the tool is removed.

FIG. 6 depicts an isometric view of the unlocked latch 10 of FIG. 5A in which the tool 100 is removed. Once the tool 100 is removed from the lock plug 18, the torsion spring 90 (see FIG. 5B), which is mounted to the lock plug 18 and the button 16, auto-rotates the lock plug 18 back to its home state (as depicted by the arrow in FIG. 6). It should be understood that the lock plug 18 is capable of auto-rotating even when the tool 100 is inserted in the lock plug 18 so long as the rotational force imparted by the spring 90 exceeds an opposite rotational force imparted by the user.

This feature of the latch 10 is referred to as automatic re-locking, and it prevents the latch 10 from being re-opened without using the tool 100, once the latch 22 is closed. Additionally, the lock plug 18 and the button 16 translate upwardly by virtue of the bias of the spring 64 and return to their initial positions shown in FIG. 2A.

Figure 7A:
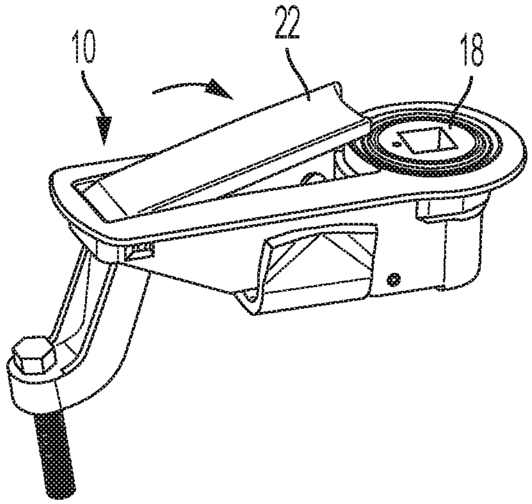
FIG. 7A is an isometric view of the latch of FIG. 6 in which the lever of the unlocked latch is shown rotated toward the locked position.
Figure 7B:
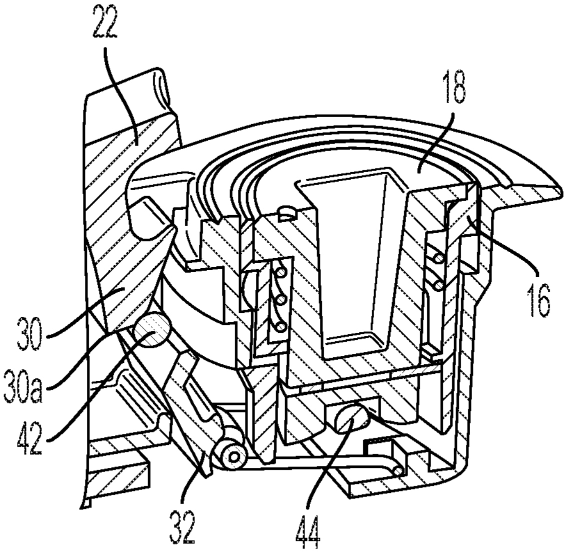
FIG. 7B is a cross-sectional view of the latch of FIG. 7A.

FIGS. 7A and 7B depicts an isometric view of the unlocked latch 10 of FIG. 6 in which the lever 22 is rotated by a user toward the latched position. As shown in FIG. 7B, as the lever 22 is rotated by a user in the clockwise direction against the bias of the torsion spring 29, the leading edge 30*a* of the hook 30 rides along the top side of the post 42 of the latching member 32.

Figure 8A:
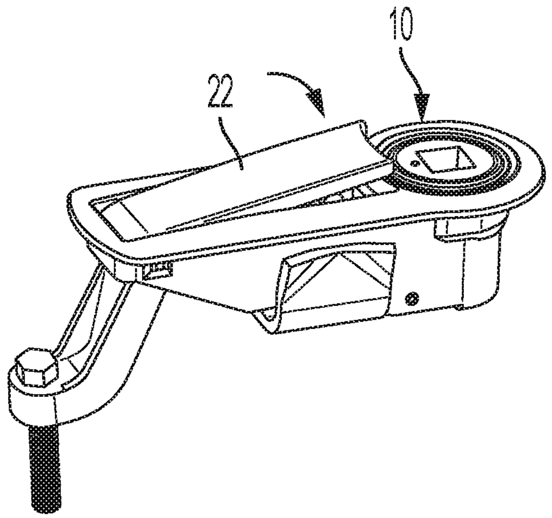
FIG. 8A is an isometric view of the latch of FIG. 7A in which the lever of the unlocked latch is shown rotated further toward the locked position.
Figure 8B:
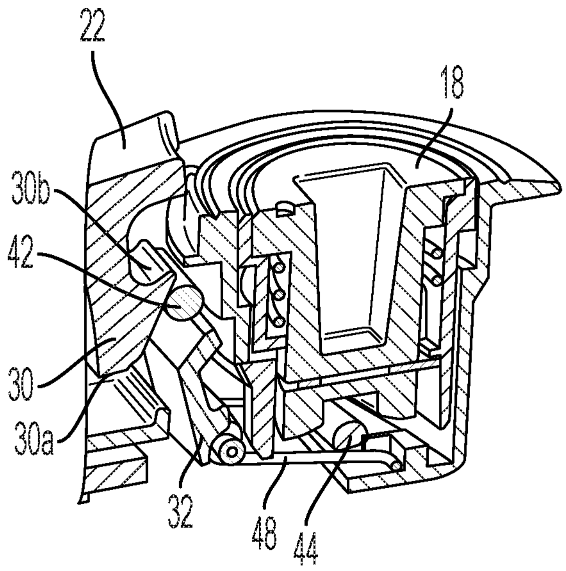
FIG. 8B is a cross-sectional view of the latch of FIG. 8A.

FIGS. 8A and 8B depicts an isometric view of the unlocked latch 10 of FIG. 7A in which the lever 22 is rotated further by a user toward the latched position. As shown in FIG. 8B, as the lever 22 is rotated further by the user in the clockwise direction against the bias of the torsion spring 29, physical contact between the leading edge 30*a* of the hook 30 and the top side of the post 42 causes the latching member 32 to pivot in the clockwise direction. Rotation of the latching member 32 continues until the post 42 clears the leading edge 30*a* of the hook 30. Thereafter, the spring 48 causes the latching member 32 to pivot in a counterclockwise direction, which causes the post 42 to seat in the curved surface 30*b* of the hook 30. At this stage, the lever 22 and the latching member 32 are in the locked state shown in FIGS. 2A and 2B.

It is noted that although the push button 16 and the lock plug 18 are shown depressed in FIGS. 7A-8B, those components may not be depressed.

FIG. 11 depicts an opening 102 in a door 104 to which the latch 10 (shown schematically and in broken lines) is mounted. The opening 102 has a D-shape and is specially configured to mate with the latch 10. The opening 102 is sized to accommodate and closely conform to the exterior dimensions of the housing 12 of the latch 10. More particularly, the opening 102 includes straight walls 106 and 108 and a rounded wall 110. The two straight side walls 106 are positioned opposite one another. The straight wall 108 intersects the straight side walls 106 at one end of the opening 102. The rounded wall 110 intersects opposite ends of the straight walls 106 at the opposite end of the opening 102. The rounded wall 110 includes a radius that is slightly greater than the radius of the exterior surface of the cylindrical wall 14 of the housing 12.

According to another embodiment of the invention, the opening 102 is rectangular, and not D-shaped. The latch 10 may also be mounted to a rectangular shaped opening.

Figure 12:
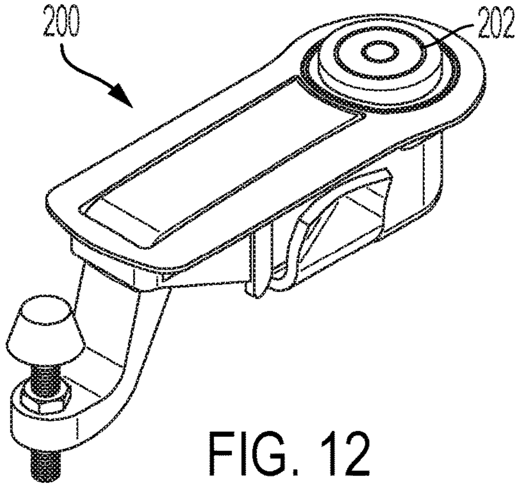
FIG. 12 depicts a non-locking push button latch, according to another exemplary embodiment of the invention.
Figure 13:
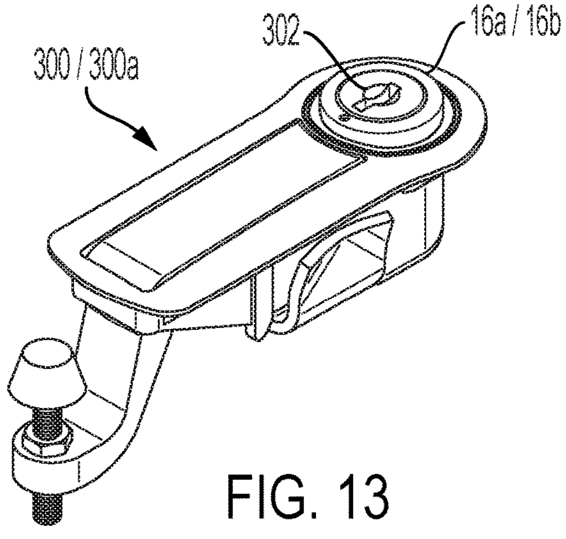
FIG. 13 depicts a key-locking push button latch, according to yet another exemplary embodiment of the invention.
Figure 14A:
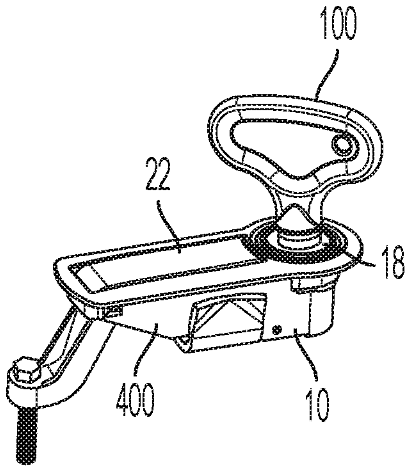
FIG. 14A is an isometric view of another auto-relocking lever compression latch, according to still another exemplary embodiment of the invention.

Other variants of the latch 10 are disclosed in FIGS. 12, 13 and 14A. Also, FIG. 15 depicts a configuration level view of the different latches shown in FIGS. 1A, 12, 13 and 14A.

FIG. 12 depicts a non-locking push-button variant of the latch 10 in which the non-locking push-button latch 200 is substantially similar to the latch 10 of FIGS. 1A-1F with the following exceptions: (i) the lock plug 18 and the button 16 are combined into a single non-rotatable and depressible push button 202 component devoid of both the opening 76 and the slot 80, and (ii) the torsion spring 90 is omitted. In operation, depressing the spring-loaded push button 202 of the non-locking latch 200 causes an engagement surface of the button 202 to depress the post 44 (referred to as a button engagement surface in this embodiment) of the spring loaded latching member 32, which causes the spring loaded latching member 32 to rotate, which causes the spring loaded latching member 32 to release the lever 22. Thereafter, the spring 48 automatically urges the lever 22 outward, like that of the latch 10.

Figure 15:
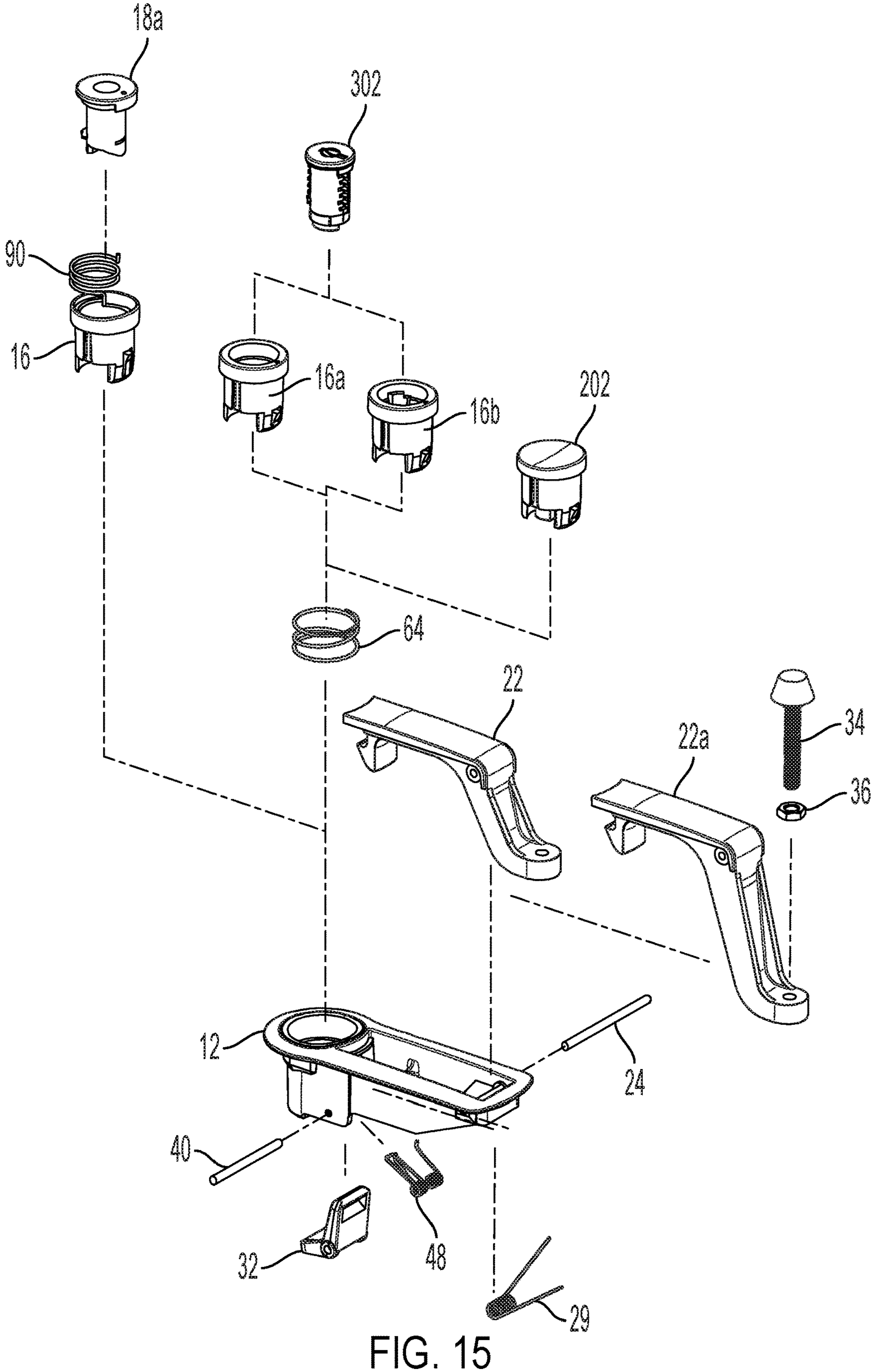
FIG. 15 depicts a configuration level view of different latch variants.

Referring to FIG. 15, the non-locking push-button style latch 200 includes at least the following components: 12, 22 (or optionally 22*a*), 24, 29, 32, 34, 36, 40, 48, 64 and 202. The lever 22*a* is substantially similar to latch 22 with the exception that the lever 22*a* includes an extended leg for accommodating a panel/door having a greater thickness.

FIG. 13 depicts two different key locking variants of a key locking latch. Those two variants are referred to hereinafter as the key-retained version and the key-removable version.

In the key-retained version of the key locking latch 300, the key locking latch 300 is substantially similar to the latch 10 of FIGS. 1A-1F with the following exceptions: (i) the tool 100 is replaced by a traditional key, (ii) the lock plug 302 includes a traditional lock barrel for operating with the key, (iii) the torsion spring 90 is omitted, and (iv) the button 16*a* (see also FIG. 15) is modified to operate with the lock plug 302. The primary operational difference between the auto-relocking latch 10 of FIGS. 1A-1F and the key locking latch 300 is that the lock plug of the key locking latch 300 is manually (and not automatically) rotated back to the home position using the key in order to permit removal of the key. The key cannot be removed until it is rotated back to the home position. For that reason, this version is referred to as the key-retained version.

Referring to FIG. 15, the key-retained version of the latch 300 includes at least the following components: 12, 22 (or optionally 22*a*), 24, 29, 32, 34, 36, 40, 48, 64, 302 and 16*a*.

In the key-removable version of the key locking latch 300*a*, the key locking latch 300*a* is also substantially similar to the latch 10 of FIGS. 1A-1F with the following exceptions: (i) the tool 100 is replaced by a traditional key, (ii) the lock plug 302 includes a traditional lock barrel for operating with the key, and (iii) the button 16*b* (see FIG. 15) is modified to operate with the lock plug 302. The primary difference between the auto-relocking latch 10 of FIGS. 1A-1F and the key locking latch 300*a* is that the lock plug 302 receives a key (as opposed to a tool). Like the tool 100 of FIGS. 1A-1F, the key may be removed from the lock plug 302 regardless of the rotational position (i.e., the locked or unlocked configurations) of the lock plug 302. For that reason, this version is referred to as the key-removable version.

Referring to FIG. 15, the key-removable version of the latch 300*a* includes at least the following components: 12, 22 (or optionally 22*a*), 24, 29, 32, 34, 36, 40, 48, 64, 302 and 16*b*.

Figure 14B:
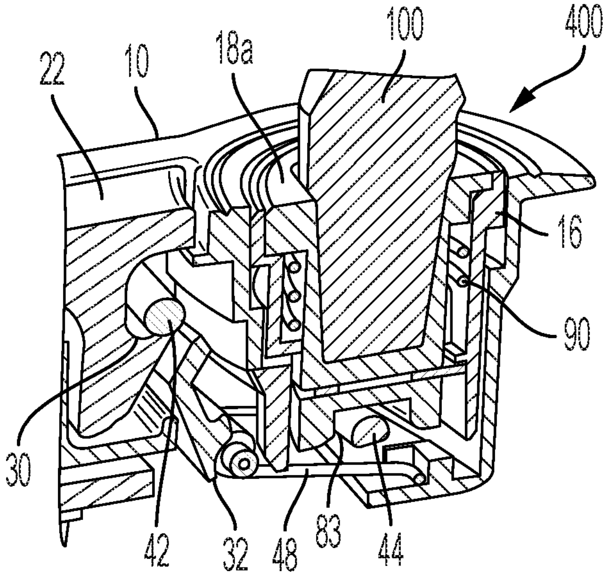
FIG. 14B is a cross-sectional view of the latch of FIG. 14A.

FIGS. 14A and 14B show an auto-relocking lever compression latch 400 (latch 10 hereinafter). The only structural differences between the latch 10 and the latch 400 is that the latch 400 does not include the compression spring 64, and the lock plug 18*a* is shorter than the lock plug 18 of the latch 10. Because the latch 400 does not include the compression spring 64, the lock plug 18*a* and the button 16 do not translate in the vertical direction, and are always positioned flush against the top surface of the housing 10.

Referring to FIG. 15, the auto-relocking lever compression latch 400 includes at least the following components: 12, 16, 18*a*, 22 (or optionally 22*a*), 24, 29, 32, 34, 36, 40, 48 and 90.

Operation of the latch 400 is also substantially the same as that of the latch 10 with the exception that the plug 18*a* and the button 16 do not translate in the vertical direction. Briefly, in operation, to unlock the latch 400, a user rotates the lock plug 18*a* using the tool 100, which causes the cam 83 of the lock plug 18*a* to depress the post 44 of the latching member 32, which causes latching member 32 to pivot, which causes the post 44 of the latching member 32 to separate from the hook 30 of the lever 22. The lever 22 auto-rotates outwardly and the latch 400 is then in an unlocked and opened state. As soon as the tool 100 is released by the user, the torsion spring 90 auto-rotates the lock plug 18*a* back to its home state, and the spring 48 auto-rotates the latching member 32 to its home state. To return the latch 400 to the locked state, a user manually depresses the lever 22 (i.e., moves the lever toward the post 42), which causes the post 42 of the latching member 32 to snap over the hook 30 of the lever 22 thereby retaining the lever 22 in the locked state.

It should be understood that because the latch 400 does not include the compression spring 64, the latch 400 is not capable of soft-locking.

Referring now to all of the embodiments, the button 16/16*a*/16*b* and push button 202 may have a different color than the remainder of their respective latches so that the button 16/16*a*/16*b* and push button 202 match the color of the door to which they are connected. The button 16/16*a*/16*b* and push button 202 may constitute light pipes that are optically connected to a light emitting diode (LED), or those components could themselves form part of an LED.

Certain features of the latches, including the housing 12, the lever 22, the push button 202 and the button 16/16*a*/16*b*, are selected for ornamental design and are not dictated by practical function. Accordingly, design elements of each latch can be varied and selected while maintaining functionality, such that a variety of ornamental configurations are available with substantially the same function or performance. For example, the contours, colors and configurations of the housing 12, the lever 22, the push button 202 and the button 16/16*a*/16*b* can be varied to provide a different ornamental appearance while maintaining substantially the same functionality. The ornamental design of the latches are protected separately in U.S. Design patent application No. 29/625,575.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A latch assembly for mounting in an opening of a door and for releasably latching the door to a door frame, said latch assembly comprising:

a housing that is mountable to the opening of the door;

a lever that is rotatably coupled to the housing for rotation between a deployed position and a retracted position, wherein in the retracted position, the lever is substantially flush with the door, and in the deployed position, the lever protrudes from the door for grasping by a user and for moving the door relative to the door frame;

a lock plug rotatably mounted within the housing, the lock plug having one end for receiving either a tool or key, and an opposite end, the opposite end having a base surface, at least one elevated surface that is elevated with respect to the base surface, and at least one ramped cam surface extending between the base surface and the at least one elevated surface; and a latching member that is moveably coupled to the housing, the latching member having a post comprising a lever engagement surface for constraining the lever in the retracted position of the lever, and a lock plug engagement surface that is configured to be contacted by the lock plug;

wherein in a first rotational position of the lock plug, the base surface of the lock plug is rotationally aligned with the lock plug engagement surface of the latching member, and rotation of the lock plug to a second rotational position, which is rotationally offset from the first rotational position, causes the at least one ramped cam surface to engage the lock plug engagement surface until the at least one elevated surface of the rotatable lock plug is rotationally aligned with the lock plug engagement surface of the latching member, whereupon the at least one elevated surface bears on the lock plug engagement surface of the latching member, which causes the lever engagement surface of the latching member to release the lever by separating the post from the lever, which permits the lever to rotate from the retracted position and toward the deployed position.

2. The latch assembly of claim 1, wherein the at least one elevated surface comprises a first elevated surface and a second elevated surface, wherein the lock plug engagement surface of the latching member is configured to be contacted by the first elevated surface and the second elevated surface, each of the first and second elevated surfaces being configured to contact the lock plug engagement surface of the latching member at the same time.

3. The latch assembly of claim 2, wherein the at least one ramped cam surface includes a first ramped cam surface and a second ramped cam surface, wherein the first ramped camp surface extends between the base surface and the first elevated surface, and wherein the second ramped cam surface extends between the base surface and the second elevated surface.

4. The latch assembly of claim 1 further comprising a compression spring for biasing the lock plug away from the housing, wherein the lock plug is translatable with respect to the housing against the bias of the compression spring.

5. The latch assembly of claim 1, further comprising:

at least one bearing structure defined on a lower surface of the housing; and a mounting bracket mounted to the lower surface of the housing, the mounting bracket being either limited or prevented from rotating on the lower surface of the housing upon mounting the mounting bracket to the housing by the at least one bearing structure, wherein the at least one bearing structure comprises multiple bearing surfaces extending from the lower surface of the housing, the multiple bearing surfaces comprising a first set of bearing surfaces comprising vertically extending elongated posts, the multiple bearing surfaces also comprising a second set of bearing surfaces comprising angled surfaces extending from a cylindrical portion of the lower surface of the housing.

6. The latch assembly of claim 5, wherein each bearing surface is configured for contacting a surface of the mounting bracket.

7. The latch assembly of claim 5, wherein the first set of bearing surfaces is positioned in contact with one side of the mounting bracket, and the second set of bearing surfaces is positioned in contact with an opposing side of the mounting bracket to prevent rotation of the mounting bracket with respect to the housing.

8. The latch assembly of claim 5, wherein the mounting bracket includes a mounting surface for contacting the lower surface of the housing and two legs extending from opposite sides of the mounting surface that are positioned adjacent side walls of the housing for contacting a surface of the door.

9. The latch assembly of claim 8, further comprising a threaded fastener that is positionable at least partially through a hole in the mounting bracket and a threaded hole in the housing.

* * * * *